United States Patent Office 2,819,282
Patented Jan. 7, 1958

2,819,282

PHENYLENE LINKED SILOXANES

Harold A. Clark, Midland, Mich., assignor to Dow Corning Corporation, Midland, Mich., a corporation of Michigan No Drawing. Application November 29, 1956
Serial No. 624,978

1 Claim. (Cl. 260—448.2)

This invention relates to a phenylene linked siloxane containing silicon bonded hydrogen.

It is the object of this invention to prepare a novel organosilicon compound which is useful as a curing agent for the siloxane solventless resin systems described and claimed in applicant's copending application entitled, "Solventless Siloxane Resins," Serial Number 624,975, filed concurrently herewith.

This invention relates to the compound

The composition of this invention represents mixed isomers in which the respective silicon atoms can be ortho, meta or para to each other. These isomers, either separately or in mixture, can be employed as curing catalysts in the aforesaid solventless resins.

The following example is illustrative of the preparation of the compounds of this invention.

*Example 1*

216 g. of water were added slowly with stirring to a mixture of 194 g. of mixed isomers of the formula

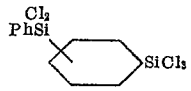

and 330 g. of dimethylmonochlorosilane. After hydrolysis was complete, the hydrolyzate was washed free of acid and distilled to give a mixture of isomers of the formula

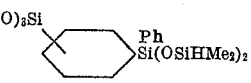

boiling about 180° C. at 6 mm.

That which is claimed is:
A compound of the formula

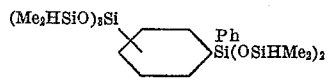

References Cited in the file of this patent
UNITED STATES PATENTS

| | | |
|---|---|---|
| 2,306,222 | Patnode | Dec. 22, 1942 |
| 2,510,642 | Krieble | June 6, 1950 |
| 2,557,931 | Barry | June 26, 1951 |